US012771046B2

(12) United States Patent
Chao

(10) Patent No.: US 12,771,046 B2
(45) Date of Patent: Oct. 20, 2026

(54) DUAL CIRCULARLY POLARIZED ANTENNA DEVICE

(71) Applicant: AUDEN TECHNO CORP., Taoyuan City (TW)

(72) Inventor: Chun-Heng Chao, Taoyuan City (TW)

(73) Assignee: AUDEN TECHNO CORP., Taoyuan City (TW)

( * ) Notice: Subject to any disclaimer, the term of this patent is extended or adjusted under 35 U.S.C. 154(b) by 51 days.

(21) Appl. No.: 18/976,358

(22) Filed: Dec. 11, 2024

(65) Prior Publication Data

US 2026/0163252 A1 Jun. 11, 2026

(51) Int. Cl.
*H01Q 21/24* (2006.01)

(52) U.S. Cl.
CPC .................................. *H01Q 21/24* (2013.01)

(58) Field of Classification Search
CPC ..................................................... H01Q 21/24
See application file for complete search history.

(56) References Cited

U.S. PATENT DOCUMENTS 11,435,472 B1* 9/2022 Or-Bach ................ G01S 13/89
11,774,579 B1* 10/2023 Wang .................... G01S 13/865 324/329
12,327,923 B2* 6/2025 Shen ........................ H01Q 5/42
2019/0140354 A1* 5/2019 Astakhov ............. H01Q 9/0428
2021/0241601 A1* 8/2021 Wan ....................... A45C 13/18
2021/0333350 A1* 10/2021 Feineman ................ G01S 3/48
2022/0399653 A1* 12/2022 Jiang .................... H01Q 9/0414
2023/0039572 A1* 2/2023 Or-Bach ................ H01Q 21/24
2023/0273294 A1* 8/2023 Or-Bach .................. G01S 7/03 600/407
2023/0378652 A1* 11/2023 Jiang .................... H01Q 21/065

(Continued)

FOREIGN PATENT DOCUMENTS

EP 4 266 502 B * 10/2023 ............. H01Q 21/00

OTHER PUBLICATIONS

Garcia-Aguilar A et al: "Low-Profile Dual Circularly Polarized Antenna Array for Satellite Communications in the X Band", IEEE Transactions on Antennas and Propagation, USA, vol. 60, No. 5, May 1, 2012 (May 1, 2012), pp. 2276-2284.

(Continued)

*Primary Examiner* — Thien M Le

(74) *Attorney, Agent, or Firm* — Li & Cai Intellectual Property Office

(57) ABSTRACT

A dual circularly polarized antenna device includes a multi-layer board, four antennas disposed on the multi-layer board, four coupled microstrip lines respectively corresponding in position to the four antennas, and a coupling module that is electrically coupled to each of the four antennas through the four coupled microstrip lines. Each of the four coupled microstrip lines includes an intermediate shaft portion, two C-shaped portions, and at least two fish bone portions. The two C-shaped portions are disposed on two sides of the intermediate shaft portion, and each has an opening facing in a direction away from the intermediate shaft portion. The at least two fish bone portions are connected to the intermediate shaft portion and the two C-shaped portions, and includes a main shaft segment and at least one extension segment that is connected to the main shaft segment and perpendicular to the main shaft segment.

9 Claims, 9 Drawing Sheets

(56) References Cited

U.S. PATENT DOCUMENTS

| | | | | |
|---|---|---|---|---|
| 2023/0408635 | A1* | 12/2023 | Or-Bach | A61B 5/0522 |
| 2024/0305014 | A1* | 9/2024 | Huang | H01Q 21/065 |

OTHER PUBLICATIONS

Then Yi Lung et al: "Compact microstrip S-Band 90° hybrid coupler",2013 IEEE Symposium On Wireless Technology& Applications (ISWTA),Sep. 22, 2013 (Sep. 22, 2013), pp. 202-206.

* cited by examiner

DUAL CIRCULARLY POLARIZED ANTENNA DEVICE

FIELD OF THE DISCLOSURE

The present disclosure relates to an antenna device, and more particularly to a dual circularly polarized antenna device.

BACKGROUND OF THE DISCLOSURE

A conventional dual circularly polarized antenna device uses a power divider to feed a 90-degree phase difference for achieving circular polarization. However, the phase and amplitude deviation in the conventional dual circularly polarized antenna device are too large, resulting in an inability to maintain a good axial ratio (i.e., AR) over a wide frequency range.

Additionally, the feeding behavior of the power divider can only generate circular polarization in a single direction (e.g., a right-hand circular polarization or a left-hand circular polarization). As a result, the conventional dual circularly polarized antenna device requires two sets of antennas and feeding systems to achieve dual circular polarization, leading to a bulky structure for conventional dual circularly polarized antenna devices.

SUMMARY OF THE DISCLOSURE

In response to the above-referenced technical inadequacy, the present disclosure provides a dual circularly polarized antenna device.

In order to solve the above-mentioned problems, one of the technical aspects adopted by the present disclosure is to provide a dual circularly polarized antenna device. The dual circularly polarized antenna device includes a multi-layer board, four antennas, four coupled microstrip lines, and a coupling module. The four antennas are disposed on the multi-layer board. Each of the four antennas has a receiving pad and a transmission pad. The four coupled microstrip lines respectively correspond in position to the four antennas. Each of the four coupled microstrip lines is symmetrical in shape and includes an intermediate shaft portion, two C-shaped portions, and at least two fish bone portions. The two C-shaped portions are disposed on two sides of the intermediate shaft portion. Each of the two C-shaped portions has an opening facing in a direction away from the intermediate shaft portion. The at least two fish bone portions are connected to the intermediate shaft portion and the two C-shaped portions. Each of the at least two fish bone portions includes a main shaft segment and at least one extension segment connected to the main shaft segment, and the main shaft segment and the at least one extension segment are perpendicular to each other. The coupling module is disposed on the multi-layer board. The coupling module is electrically coupled to the receiving pad and the transmission pad of each of the four antennas through the four coupled microstrip lines.

Therefore, in the dual circularly polarized antenna device provided by the present disclosure, by virtue of "each of the four coupled microstrip including an intermediate shaft portion, two C-shaped portions, and at least two fish bone portions that are connected to the intermediate shaft portion and the two C-shaped portions," and "the coupling module been electrically coupled to the receiving pad and the transmission pad of each of the four antennas through the four coupled microstrip lines," the dual circularly polarized antenna device can generate dual circular polarization and has a relatively compact size.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
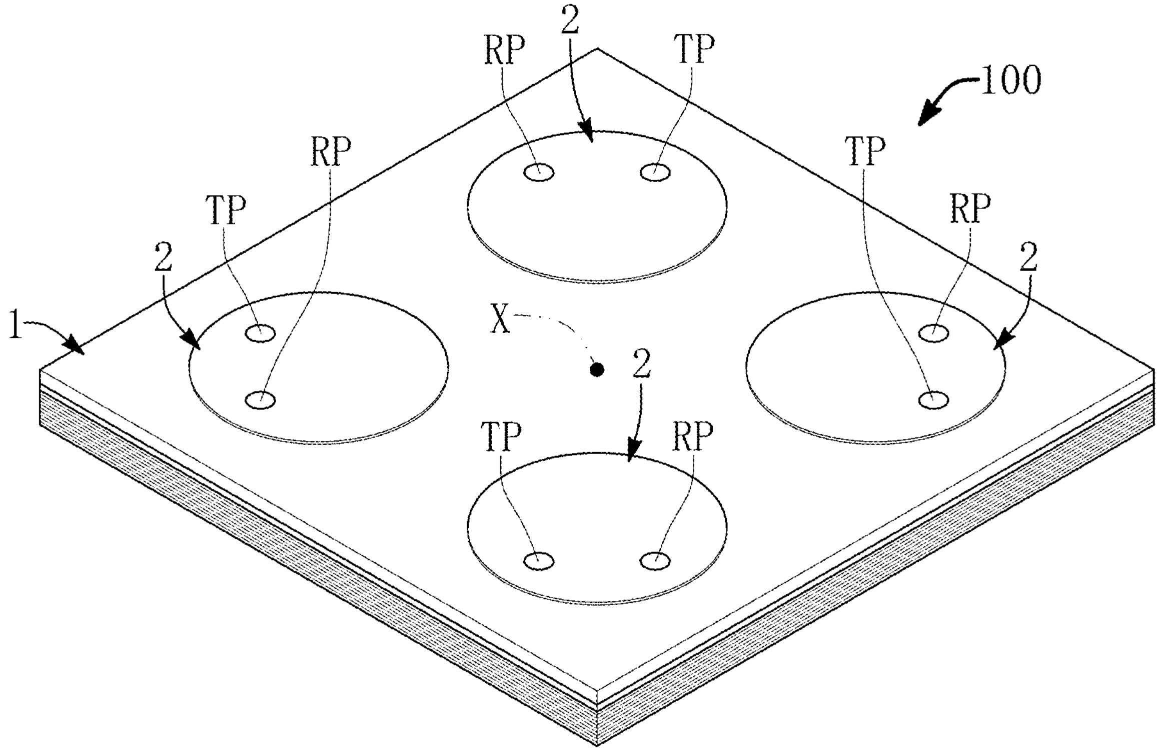
FIG. 1 is a schematic perspective view of a dual circularly polarized antenna device according to the present disclosure.
Figure 2:
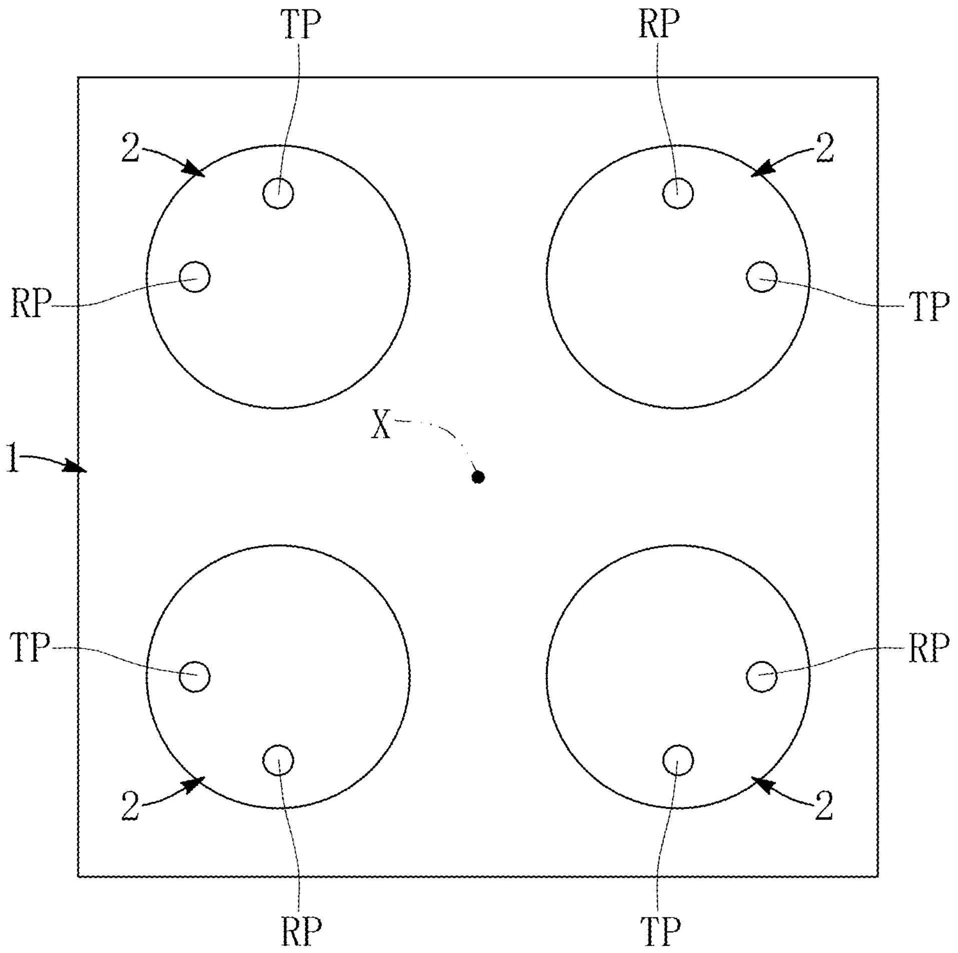
FIG. 2 is a schematic top view of the dual circularly polarized antenna device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 5:
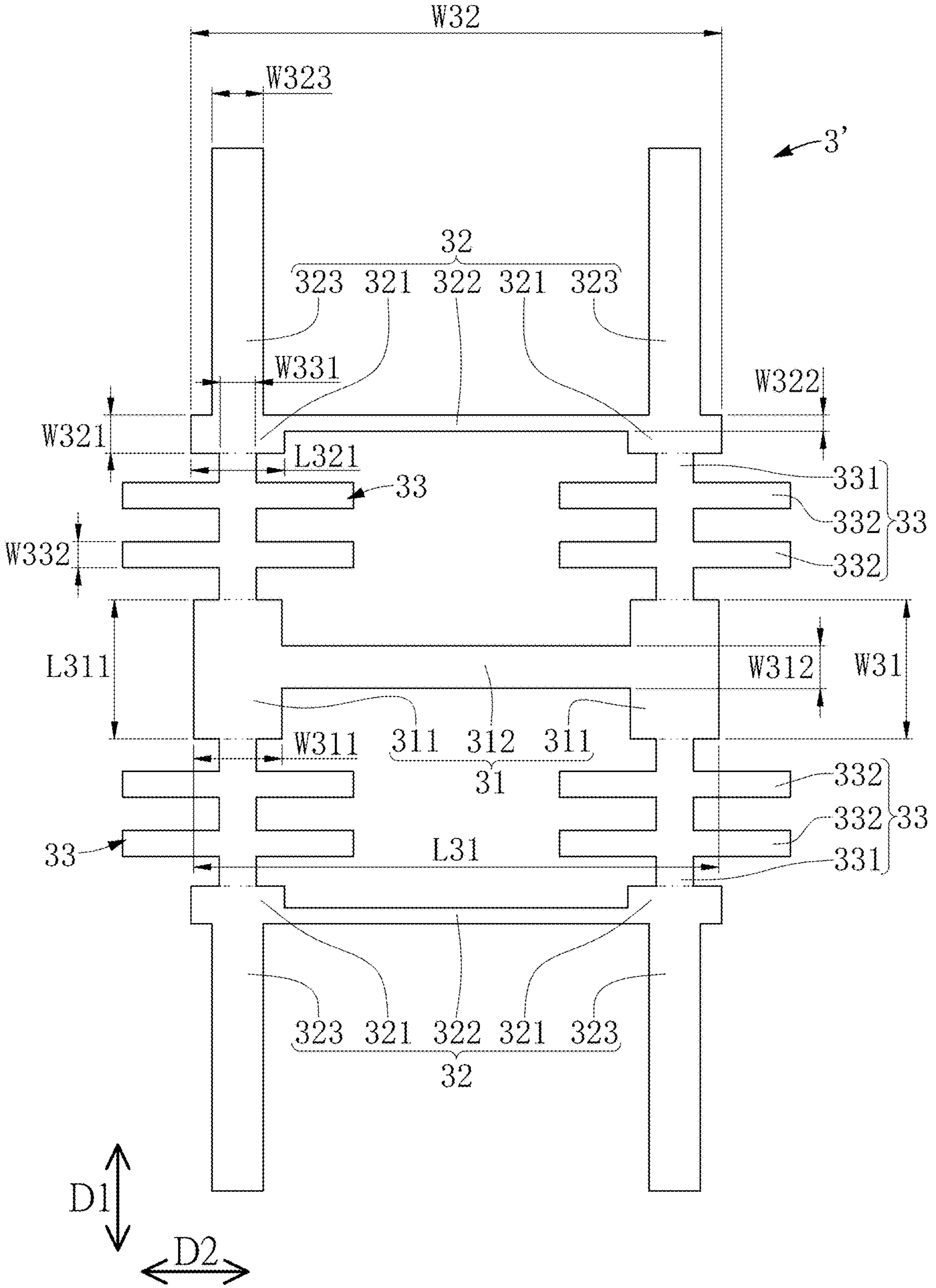
FIG. 5 is another schematic planar view of the four coupled microstrip lines of the dual circularly polarized antenna device according to the present disclosure.
Figure 6:
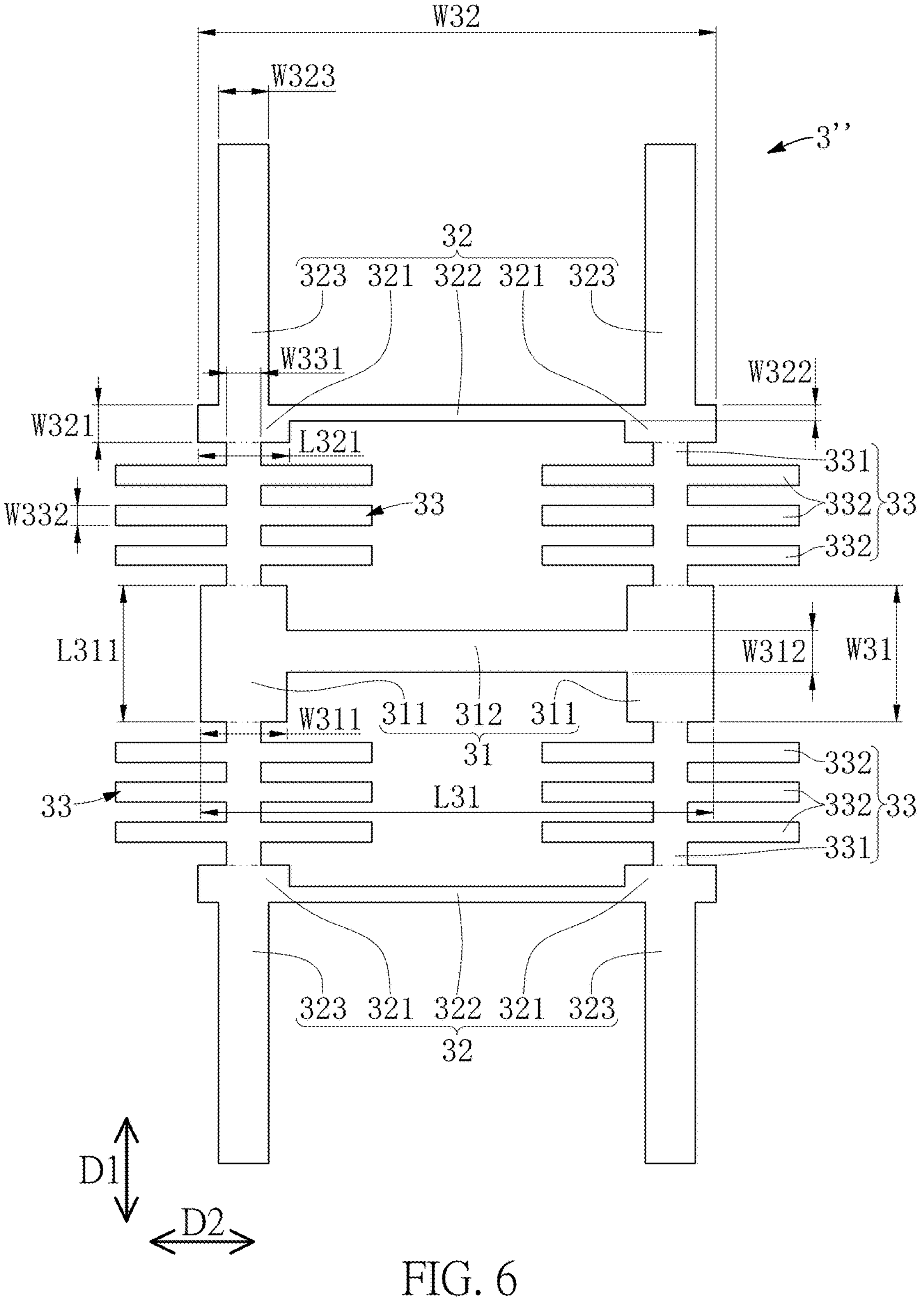
FIG. 6 is yet another schematic planar view of the four coupled microstrip lines of the dual circularly polarized antenna device according to the present disclosure.
Figure 7:
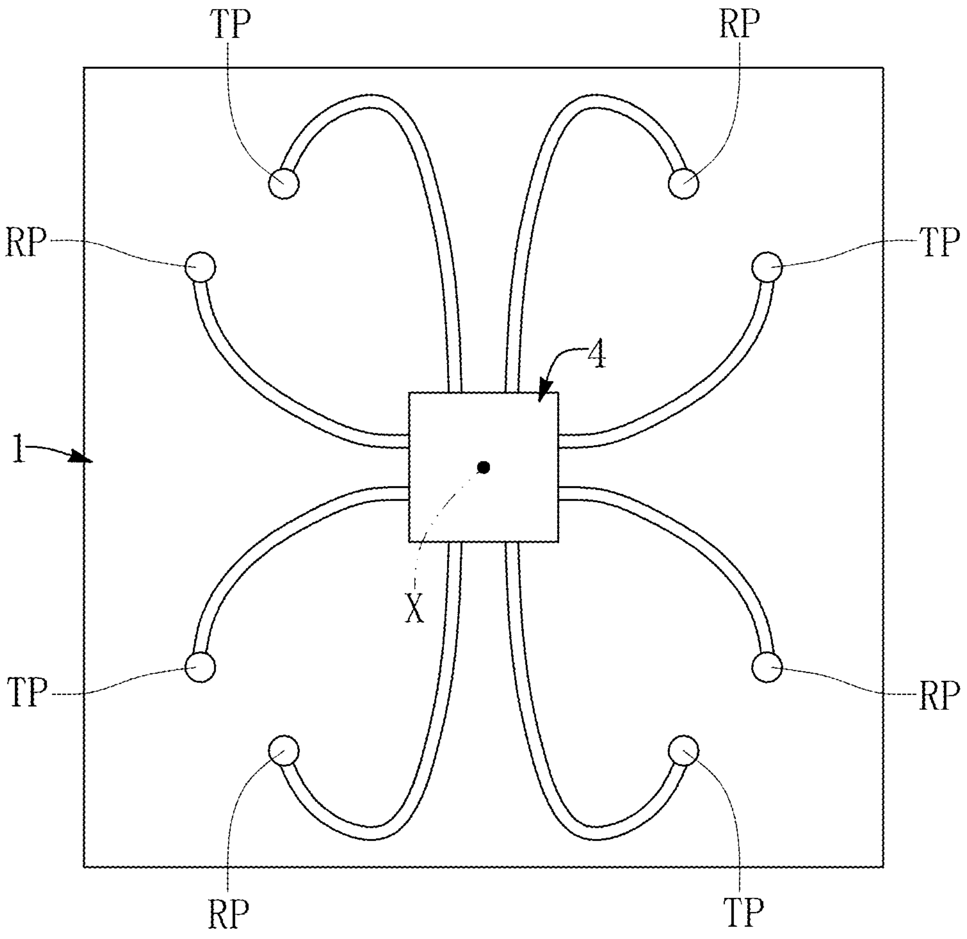
FIG. 7 is a schematic planar view of a coupling module of the dual circularly polarized antenna device disposed on the multi-layer board according to the present disclosure.

Referring to FIG. 1 to FIG. 8, an embodiment of the present disclosure provides a dual circularly polarized antenna device 100. As shown in FIG. 1 and FIG. 7, the dual circularly polarized antenna device 100 includes a multi-layer board 1, four antennas 2 disposed on the multi-layer board 1, four coupled microstrip lines 3 electrically and respectively coupled to the four antennas 2, and a coupling module 4 that is electrically and respectively coupled to the four coupled microstrip lines 3. The following description describes the structure and connection relation of each component of the dual circularly polarized antenna device 100.

Referring to FIG. 1, the multi-layer board 1 is a multi-layer structure made of insulating material, and the four antennas 2 are disposed on an outer layer (not labeled) of the multi-layer board 1. In the present embodiment, the four antennas 2 are generally circular in shape and have a center (not labeled). Each of the four antennas 2 has a receiving pad RP and a transmission pad TP that are located around the center, but the shape of the antennas 2 is not limited thereto. For example, in another embodiment of the present disclosure (not shown), each of the four antennas 2 may also take the form of a hexagon.

In practice, the four antennas 2 are arranged in a matrix configuration (e.g., 2 by 2) on the multi-layer board 1. In other words, the multi-layer board 1 has a reference point X, and the four coupled microstrip lines 3 are arranged to be centered around the reference point X. Preferably, the four antennas 2 are arranged in a configuration that has a four-fold rotational symmetry relative to the reference point X.

Figure 3:
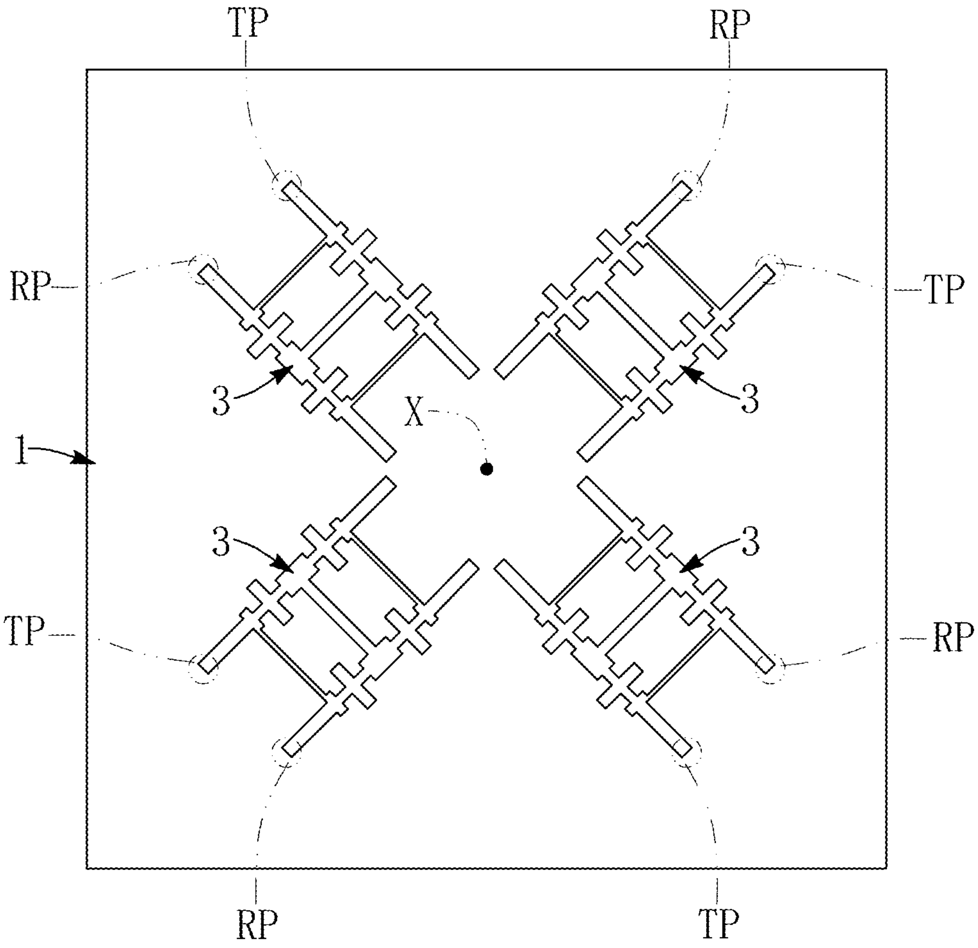
FIG. 3 is a schematic planar view of four coupled microstrip lines of the dual circularly polarized antenna device disposed on a multi-layer board according to the present disclosure.
Figure 4:
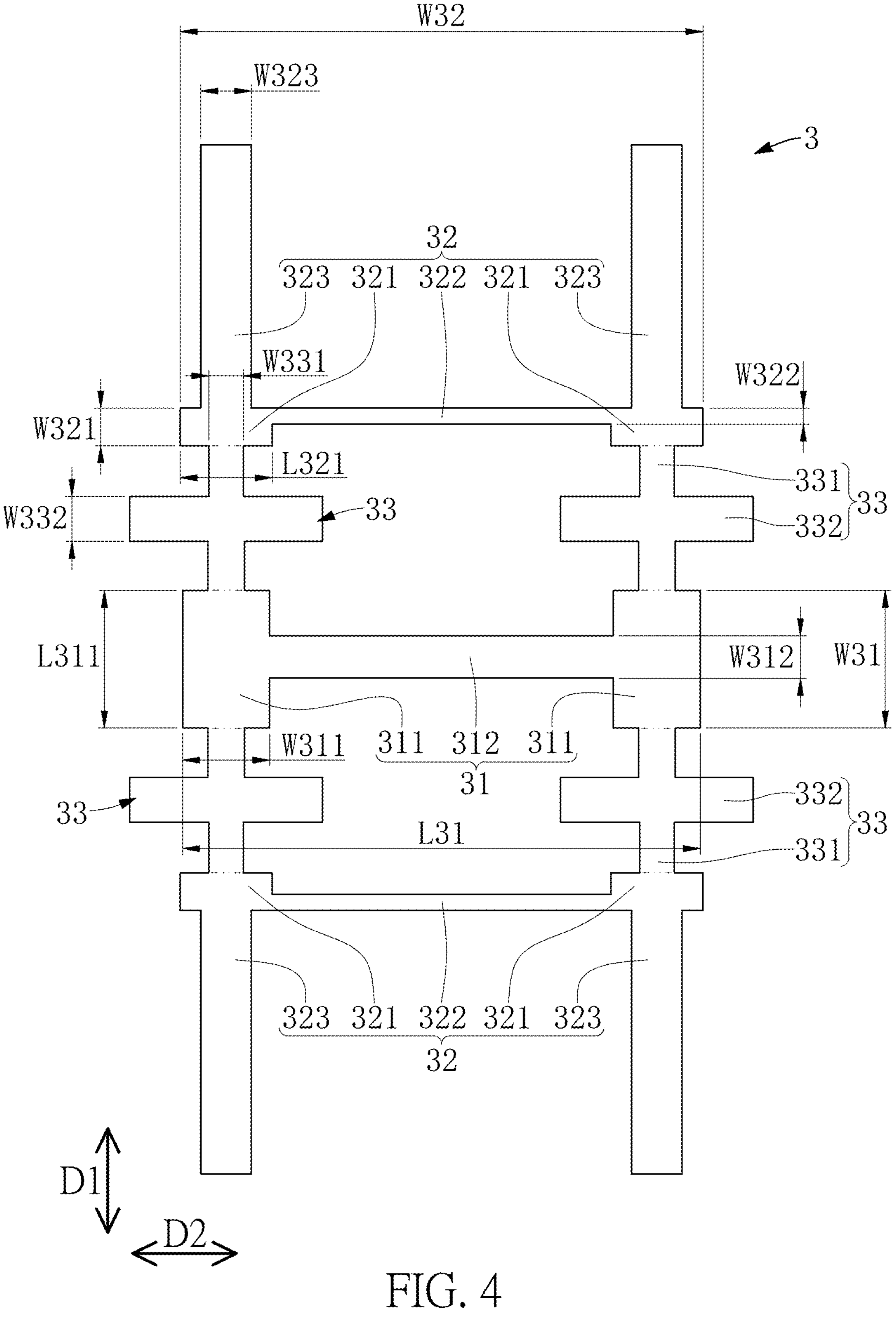
FIG. 4 is a schematic planar view of the four coupled microstrip lines of the dual circularly polarized antenna device according to the present disclosure.

Referring to FIG. 3 and FIG. 4, the four coupled microstrip lines 3 are respectively disposed on a middle layer (not labeled) of the multi-layer board 1, and respectively correspond in position to the four antennas 2. In other words, the four coupled microstrip lines 3 can also be arranged in a configuration that has a four-fold rotational symmetry relative to the reference point X. In addition, the four coupled microstrip lines 3 are electrically coupled to the four antennas 2 through a plurality of conductive vias (not labeled) of the multi-layer board 1.

Referring to FIG. 3 and FIG. 4, each of the four coupled microstrip lines 3 is symmetrical in shape and includes an intermediate shaft portion 31, two C-shaped portions 32 located on two sides of the intermediate shaft portion 31, and at least two fish bone portions 33 that are connected to the intermediate shaft portion 31 and the two C-shaped portions 32.

For the convenience of description, each of the four coupled microstrip lines 3 is generally regarded as a rectangle, defined by a first direction D1 and a second direction D2 perpendicular to the first direction D1. The first direction D1 is parallel to a long side of each of the four coupled microstrip lines 3, and the second direction D2 is parallel to a short side each of the four coupled microstrip lines 3.

The intermediate shaft portion 31 in the present embodiment is generally I-shaped and includes two rectangular intermediate connecting blocks 311 and an intermediate long segment 312 that is connected to the two intermediate connecting blocks 311.

The two C-shaped portions 32 are disposed on the two sides of the intermediate shaft portion 31, and the two C-shaped portions 32 are symmetrically positioned with respect to (a centerline of) the intermediate long segment 312 as the axis of symmetry. Each of the two C-shaped portions 32 has an opening (not labeled), and the opening of each of the two C-shaped portions 32 faces in a direction away from the intermediate shaft portion 31.

In the present embodiment, each of the two C-shaped portions 32 includes two outer connecting blocks 321, a first outer long segment 322, and two second outer long segments 323. The two outer connecting blocks 321 are rectangular in shape and are spaced apart from each other. The first outer long segment 322 is disposed between the two outer connecting blocks 321, and the first outer long segment 322 is connected to the two outer connecting blocks 321. The two second outer long segments 323 extend from the two outer connecting blocks 321 in a direction away from the intermediate shaft portion 31, and each of the two second outer long segments 323 is not parallel to the first outer long segment 322 (e.g., each of the two second outer long segments 323 is perpendicular to the first outer long segment 322).

A width W322 of the first outer long segment 322 along the first direction D1 may be less than a width W323 of each of the two second outer long segments 323 along the second direction D2, and a width W322 of the first outer long segment 322 along the first direction D1 may be less than a width W312 of the intermediate long segment 312 along the first direction D1.

It should be noted that, in practice, a width W32 of each of the two C-shaped portions 32 along the second direction D2 may be substantially equal to a length L31 of the intermediate shaft portion 31 along the second direction D2. That is to say, a total length of the two outer connecting blocks 321 and the first outer long segment 322 along the second direction D2 is substantially equal to a total length of the two intermediate connecting blocks 311 and the intermediate long segment 312 along the second direction D2, but the present disclosure is not limited thereto.

Additionally, a length L321 of each of the two outer connecting blocks 321 along the second direction D2 can be equal to a width W311 of the intermediate connecting block 311 along the second direction D2, and a width W321 of each of the two outer connecting blocks 321 along the first direction D1 can be less than a length L311 of the intermediate connecting block 311 along the first direction D1. In other words, an area of each of the two outer connecting blocks 321 is less than or equal to an area of the intermediate connecting block 311.

Referring to FIG. 3 and FIG. 4, the at least two fish bone portions 33 are connected to the intermediate shaft portion 31 and the two C-shaped portions 32. The at least two fish bone portions 33 are connected to the intermediate shaft portion 31 and the two C-shaped portions 32 with a center line of each of the four coupled microstrip lines 3 as the axis of symmetry, so that each of the four coupled microstrip lines 3 is symmetrical in shape. In the present embodiment, each of the four coupled microstrip lines 3 is described as having four fish bone portions 33, but the present disclosure is not limited thereto.

Each of the four fish bone portions 33 includes a main shaft segment 331 and at least one extension segment 332 that is connected to the main shaft segment 331, and the main shaft segment 331 and the at least one extension segment 332 are perpendicular to each other. Preferably, the at least one extension segment 332 can be parallel to the first outer long segment 322 and the intermediate long segment 312, and the main shaft segment 331 is perpendicular to the first outer long segment 322 and the intermediate long segment 312. In other words, a shape of each of the four coupled microstrip lines 3 is generally ladder-like.

It should be noted that, in practice, the dual circularly polarized antenna device 100 is designed for a specific transmission frequency band. A length of the at least one extension segment 332 of each of the four fish bone portions 33 along the second direction D2 is greater than or equal to ¼ of a wavelength corresponding to a center frequency of the transmission band. In addition, a width W331 of the main shaft segment 331 of each of the four fish bone portions 33 along the second direction D2 and a width W332 of the at least one extension segment 332 along the first direction D1 are less than a width W31 of the intermediate shaft portion 31 along the first direction D1. The width W331 of the main shaft segment 331 along the second direction D2 and the width W332 of the at least one extension segment 332 along the first direction D1 are inversely proportional to a quantity of the at least one extension segment 332.

More specifically, the quantity of the at least one extension segment 332 in each of the four fish bone portions 33 can be adjusted. For example, each of the four fish bone portions 33 can have one extension segment 332 (as shown in FIG. 4), two extension segments 332 (as shown in FIG. 5), or three extension segments 332 (as shown in FIG. 6). As shown in FIG. 4, when each of the four fish bone portions 33 has one extension segment 332, the width W331 of the main shaft segment 331 along the second direction D2 can be 0.4 mm, and the width W332 of the extension segment 332 along the first direction D1 can be 0.5 mm. As shown in FIG. 5, when each of the four fish bone portions 33 has two extension segments 332, the width W331 of the main shaft segment 331 along the second direction D2 can be 0.25 mm, and the width W332 of each of the two extension segments 332 along the first direction D1 can be 0.25 mm. As shown in FIG. 6, when each of the four fish bone portions 33 has three extension segments 332, the width W331 of the main shaft segment 331 along the second direction D2 can be 0.25 mm, and the width W332 of each of the three extension segments 332 along the first direction D1 can be 0.15 mm.

Accordingly, under the condition of maintaining constant impedance, the dual circularly polarized antenna device 100 can have its overall size reduced by increasing the quantity of the extension segments 332.

More specifically, a region of each of the four coupled microstrip lines 3 enclosed by "the two outer connecting blocks 321 and the first outer long segment 322 of each of the four fish bone portions 33, and the two intermediate connecting blocks 311 of the intermediate shaft portion 31" serves as a reference size. The dual circularly polarized antenna device 100 uses the fish bone portion 33 without any extension segments 332 as the base size, represented as 100%. The reference sizes of the dual circularly polarized antenna device 100 with different quantities of the extension segments 332 are shown in Table 1 below.

TABLE 1

| Quantity of the extension segment | Reference size | Proportion |
|---|---|---|
| zero | 7.84 mm*8.85 mm | 100% |
| one | 7 mm*5.55 mm | 55% |

TABLE 1-continued

| Quantity of the extension segment | Reference size | Proportion |
|---|---|---|
| two | 7 mm*5.15 mm | 51% |
| three | 7 mm*4.15 mm | 41% |

Figure 8:
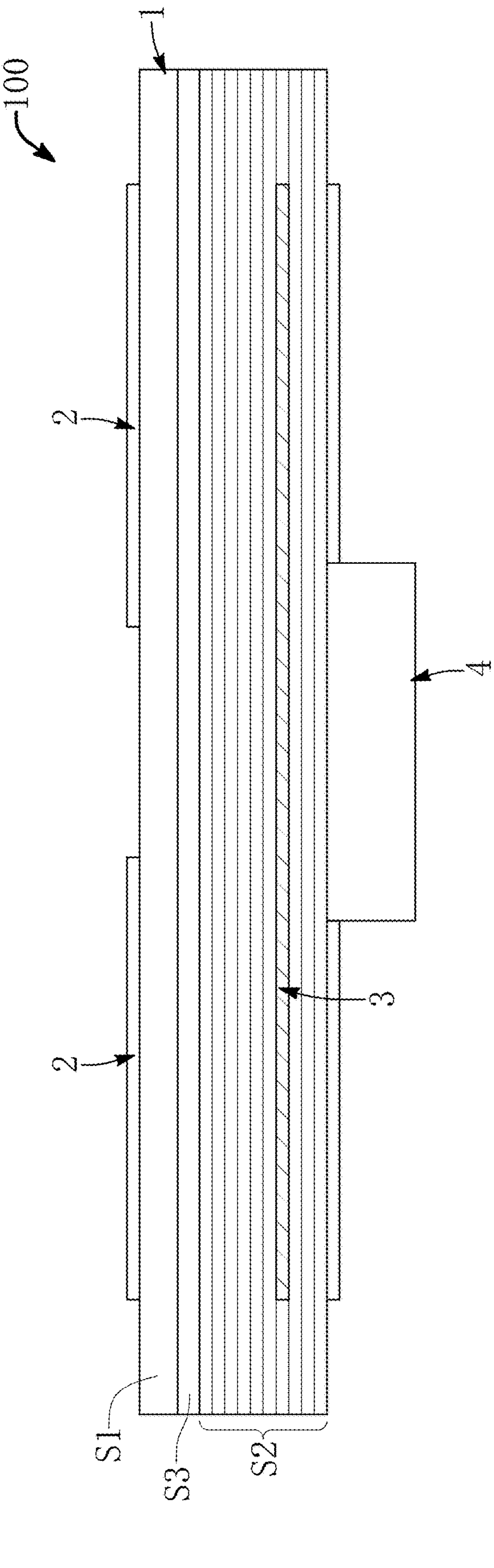
FIG. 8 is a schematic cross-sectional view of the dual circularly polarized antenna device according to the present disclosure.

Referring to FIG. 3, FIG. 7, and FIG. 8, the coupling module 4 is disposed on the multi-layer board 1 and is electrically coupled to the receiving pad RP and the transmission pad TP of each of the four antennas 2 through the four coupled microstrip lines 3 (e.g., by conductive vias). In the present embodiment, the coupling module 4 is electrically coupled to the receiving pad RP and the transmission pad TP by being connected to one of the C-shaped portions 32.

Additionally, it is worth noting that a thickness of each of the four antennas in the dual circularly polarized antenna device 100 is directly proportional to the bandwidth. When the dual circularly polarized antenna device is in an array configuration, a substrate carrying the four antennas may experience warping. Accordingly, in the present disclosure, the dual circularly polarized antenna device 100 uses a "soldered connection between the antenna board and the main board" approach for the multi-layer board 1 to address the warping issue.

Specifically, the multi-layer board 1 includes a first outer structure S1, a second outer structure S2, and a welded structure S3. The first outer structure S1 serves as the antenna board and includes the four antennas 2. The second outer structure S2 acts as the main board and includes the coupling module 4 and the four coupled microstrip lines 3. The first outer structure S1 and the second outer structure S2 are connected via the welded structure S3.

Figure 9:
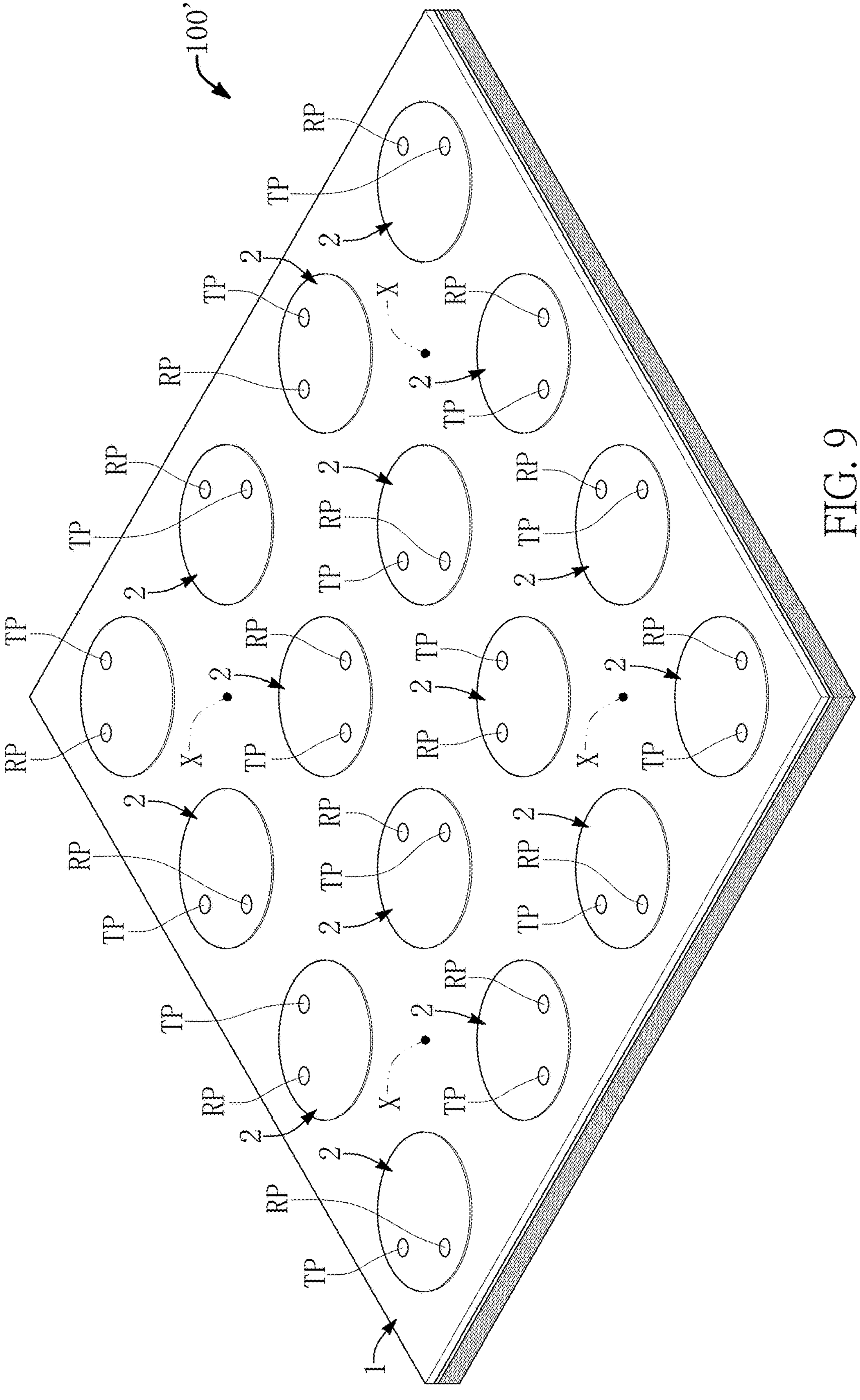
FIG. 9 is a schematic planar view of the dual circularly polarized antenna device according to the present disclosure in another implementation.

It should be specifically noted that, in the present embodiment, the dual circularly polarized antenna device 100 is described using "the four antennas 2, the four coupled microstrip lines 3, and the coupling module 4" as one antenna unit. In practice, as shown in FIG. 9, the dual circularly polarized antenna device 100' can have a plurality of antenna units disposed on the multi-layer board 1.

Beneficial Effects of the Embodiment

In conclusion, in the dual circularly polarized antenna device provided by the present disclosure, by virtue of "each of the four coupled microstrip including an intermediate shaft portion, two C-shaped portions, and at least two fish bone portions that are connected to the intermediate shaft portion and the two C-shaped portions," and "the coupling module been electrically coupled to the receiving pad and the transmission pad of each of the four antennas through the four coupled microstrip lines," the dual circularly polarized antenna device can generate dual circular polarization and has a relatively compact size.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dual circularly polarized antenna device, comprising:
a multi-layer board;
four antennas disposed on the multi-layer board, wherein each of the four antennas has a receiving pad and a transmission pad;
four coupled microstrip lines respectively corresponding in position to the four antennas, wherein each of the four coupled microstrip lines is symmetrical in shape and includes:
an intermediate shaft portion;
two C-shaped portions disposed on two sides of the intermediate shaft portion, wherein each of the two C-shaped portions has an opening facing in a direction away from the intermediate shaft portion; and
at least two fish bone portions connected to the intermediate shaft portion and the two C-shaped portions, wherein each of the at least two fish bone portions includes a main shaft segment and at least one extension segment connected to the main shaft segment, and the main shaft segment and the at least one extension segment are perpendicular to each other; and
a coupling module disposed on the multi-layer board, wherein the coupling module is electrically coupled to the receiving pad and the transmission pad of each of the four antennas through the four coupled microstrip lines;
wherein each of the four coupled microstrip lines has a first direction and a second direction perpendicular to the first direction, and a width of the main shaft segment of each of the at least two fish bone portions along the second direction and a width of the at least one extension segment of each of the at least two fish bone portions along the first direction are inversely proportional to a quantity of the at least one extension segment of each of the at least two fish bone portions, and wherein the dual circularly polarized antenna device is applicable to a transmission band, and a length of the at least one extension segment of each of the at least two fish bone portions along the second direction is greater than or equal to ¼ of a wavelength corresponding to a center frequency of the transmission band.

2. The dual circularly polarized antenna device according to claim 1, wherein the multi-layer board has a reference point, the four antennas are arranged in a configuration that has a four-fold rotational symmetry relative to the reference point, and the four coupled microstrip lines are arranged in a configuration that has a four-fold rotational symmetry relative to the reference point.

3. The dual circularly polarized antenna device according to claim 1, wherein each of the four coupled microstrip lines has a first direction and a second direction perpendicular to the first direction, and a width of the main shaft segment of each of the at least two fish bone portions along the second direction and a width of the at least one extension segment of each of the at least two fish bone portions along the first direction are less than a width of the intermediate shaft portion along the first direction.

4. The dual circularly polarized antenna device according to claim 1, wherein each of the two C-shaped portions includes:
two outer connecting blocks;
a first outer long segment connected to the two outer connecting blocks; and
two second outer long segments extending from the two outer connecting blocks in a direction away from the intermediate shaft portion, and each of the two second outer long segments is not parallel to the first outer long segment.

5. The dual circularly polarized antenna device according to claim 4, wherein each of the four coupled microstrip lines has a first direction and a second direction perpendicular to the first direction, and a width of the first outer long segment along the first direction is less than a width of each of the two second outer long segments along the second direction.

6. The dual circularly polarized antenna device according to claim 4, wherein each of the four coupled microstrip lines has a first direction and a second direction perpendicular to the first direction, and the intermediate shaft portion includes two intermediate connecting blocks, and an intermediate long segment that is connected to the two intermediate connecting blocks, wherein a width of each of the two intermediate connecting blocks along the second direction is equal to a width of each of the two outer connecting blocks along the first direction, and a width of the intermediate long segment along the first direction is greater than a width of the first outer long segment along the first direction.

7. The dual circularly polarized antenna device according to claim 6, wherein the first outer long segment is parallel to the intermediate long segment and the at least one extension segment, and the first outer long segment is perpendicular to the second outer long segment and the main shaft segment.

8. The dual circularly polarized antenna device according to claim 6, wherein an area of each of the two intermediate connecting blocks is greater than an area of each of the two outer connecting blocks.

9. The dual circularly polarized antenna device according to claim 1, wherein the multi-layer board includes:
a first outer structure including the four antennas;
a second outer structure disposed on one side of the first outer structure, wherein the second outer structure includes the coupling module and the four coupled microstrip lines; and
a welded structure connected to the first outer structure and the second outer structure.

* * * * *